(12) United States Patent
Kurihara

(10) Patent No.: US 6,385,223 B1
(45) Date of Patent: May 7, 2002

(54) METHOD FOR CONNECTING OPTICAL WAVEGUIDE AND OPTICAL SEMICONDUCTOR DEVICE AND APPARATUS FOR CONNECTING THE SAME

(75) Inventor: Mitsuru Kurihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/499,206

(22) Filed: Feb. 7, 2000

(30) Foreign Application Priority Data

Feb. 10, 1999 (JP) .......................................... 11-033464

(51) Int. Cl.[7] ................................................ H01S 5/00
(52) U.S. Cl. ................................ 372/43; 372/43; 372/5
(58) Field of Search ................................ 372/43, 5, 64

(56) References Cited

FOREIGN PATENT DOCUMENTS

| EP | 0 636 911 A1 | 2/1995 | ............ G02B/6/42 |
|----|--------------|--------|----------------------|
| JP | 0 811 16 00  | 4/1996 | .......... H05K/13/04 |
| JP | 0 920 52 55  | 8/1997 | ............ H01S/3/18 |

OTHER PUBLICATIONS

Inoue Y et al. "PLC Hybrid Integrated WDM Transceiver Module for Access Networks", NTT Review, JP, Telecommunications Association, Tokyo, vol. 9, No. 6, Nov. 1, 1997 pp. 55–64.

Nakagawa G et al. "High Power and High Sensitivity Planar Lightwave Circuit Module Incorporating a Novel Passive Alighnment Method", Journal of Lightwave Technology, US, IEEE. NY, vol. 16, No. 1, Jan. 1, 1998, pp. 66–71, XP000739110, ISSN: 0733–8724.

*Primary Examiner*—Frank G. Font
*Assistant Examiner*—Delma R. Flores Ruiz
(74) *Attorney, Agent, or Firm*—Michael Best & Friedrich LLC; J. Warren Whitesel

(57) ABSTRACT

A method for connecting an optical waveguide and an optical semiconductor device and an apparatus for connecting the same, capable of removing a working error and getting a high optical coupling coefficiency. The method consisting of the steps of: moving the optical semiconductor device to the substrate so as to overlap the pair of the first positioning marks and the pair of the second positioning marks; obtaining an actual distance from the outgoing surface to the pair of the second positioning marks, based on an image photographed by allowing the infrared ray to transmit through the substrate and the optical semiconductor device; obtaining an error between the actual distance and a designed distance previously set, by subtracting the designed distance between the outgoing surface of the optical semiconductor device and the pair of the second positioning marks from the actual distance; moving the pair of the second positioning marks relative to the pair of the first positioning marks by a quantity equal to the error so as to cancel the error; and jointing the optical semiconductor device to the substrate.

4 Claims, 14 Drawing Sheets

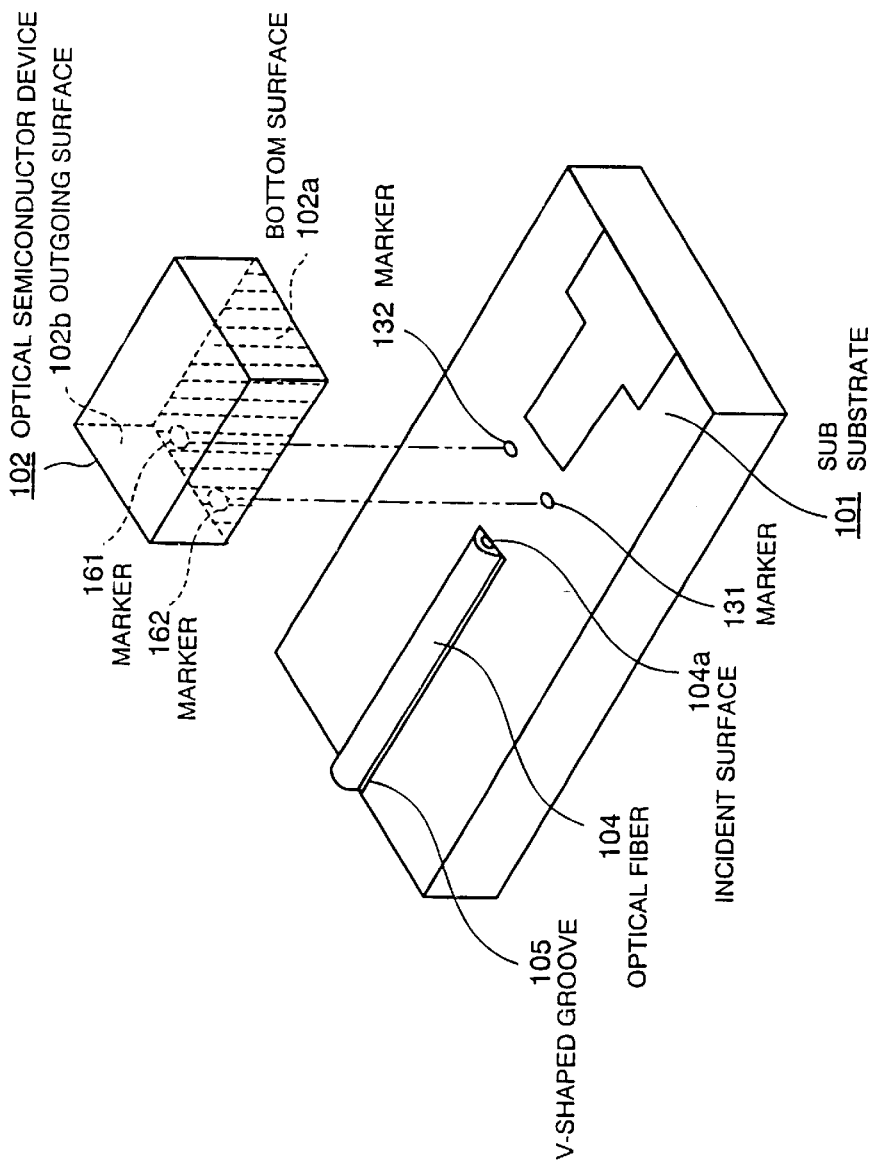
Fig. 10 (PRIOR ART)
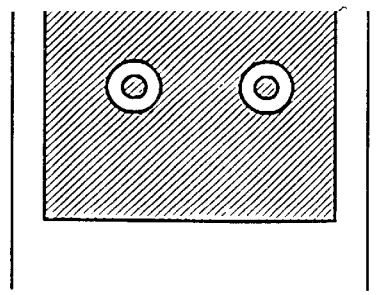

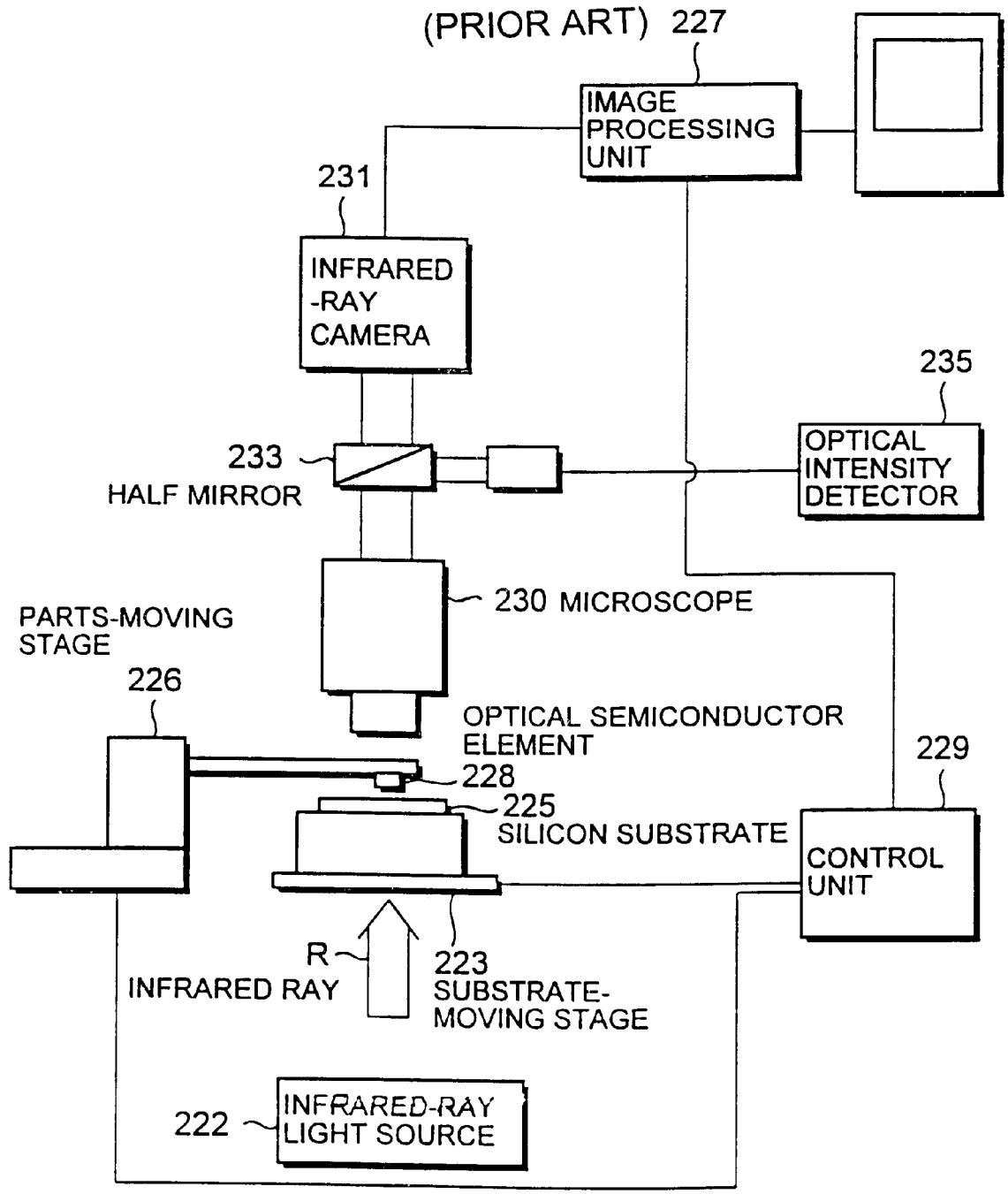

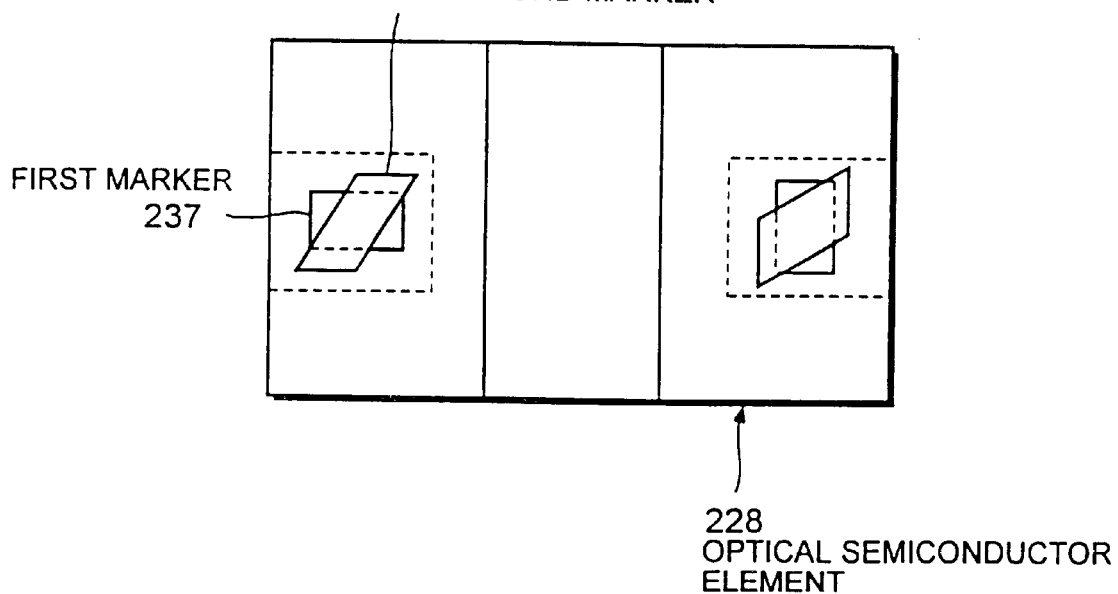

METHOD FOR CONNECTING OPTICAL WAVEGUIDE AND OPTICAL SEMICONDUCTOR DEVICE AND APPARATUS FOR CONNECTING THE SAME

BACKGROUND OF THE INVENTION

1. Field of the Invention

The present invention relates to a method for connecting an a optical waveguide and an optical semiconductor device and an apparatus for connecting the same, particularly to an improvement of a passive alignment system.

2. Description of the Prior Arts

There has existed an electric-optical conversion device called an optical module, which is constituted by integrating an optical semiconductor device such as a semiconductor laser diode and an optical waveguide such as an optical fiber.

In fabricating the optical module, it is an important challenge to allow an emitted light from the optical semiconductor device to be incident onto the optical waveguide with minimal waste and to increase optical coupling coefficiency.

As methods to connecting the optical semiconductor device and the optical waveguide, there have existed an active alignment method and a passive alignment method.

The active alignment method is the one performed as follows. Specifically, an optical semiconductor device is actually made to emit a light and the emitted light is incident onto an optical waveguide. Relative positions of the optical semiconductor device and the optical waveguide with respect to each other are finely adjusted so as to maximize an intensity of the emitted light from the optical waveguide, thus connecting the optical semiconductor device and the optical waveguide.

On the other hand, the passive alignment method is performed as follows. Specifically, the optical semiconductor device is actually not made to emit a light, but alignment marks previously formed in both of the optical semiconductor device and the optical waveguide are made to be coincident with each other. Thus finely adjusting the relative positions of the optical semiconductor device and the optical waveguide with respect to each other to connect them.

In Japanese Patent Laid-Open No. Hei 7 (1995)-43565, published on Feb. 14, 1995, a method to connect the optical waveguide and the optical semiconductor device using the passive alignment method is disclosed. A technology written in the gazette will be described as a first conventional example.

FIG. 10 is a perspective view showing a method for connecting an optical waveguide and an optical semiconductor device of the first conventional example.

In FIG. 10, an optical semiconductor device 102 is loaded onto a sub substrate 101. A thin film for shielding infrared ray is formed entirely on an overall bottom surface 102a of the optical semiconductor device 102 other than regions of markers 161 and 162. The sub substrate 101 has a thin film for shielding infrared ray only at regions of markers 131 and 132, and accommodates an optical fiber 104 in its V-shaped groove 105.

Next, the infrared ray (not shown) is made to transmit through the sub substrate 101 upward from an infrared ray source (not shown) provided below the sub substrate 101, and the markers 131, 132, 161 and 162 are photographed by an infrared ray camera (not shown) provided above the sub substrate 101.

FIG. 11 is a schematic view showing a photographed image in the first conventional connection method.

In FIG. 11, the photographed image of the markers 131, 132, 161 and 162 undergoes an image processing, and relative positions of the optical semiconductor device 102 and the sub substrate 101 with respect to each other are corrected so that areal centers of gravity of the markers 131 and 132 and areal centers of gravity of the markers 161 and 162 are coincident with each other. Thereafter, the optical semiconductor device 102 is loaded onto the sub substrate 101 and jointed to the sub substrate 101, whereby a precision in the connection of the optical semiconductor device 102 and the optical fiber 104 is increased.

Moreover, in Japanese Patent Laid-Open No. Hei 8 (1996)-111600, published on Apr. 30, 1996, a high precision mounting method using a passive alignment method for controlling relative positions of an optical semiconductor device and an optical waveguide based on an overlapping state of polygonal markers is disclosed. A technology written in the gazette is described as a second conventional example.

FIG. 12 is a perspective view showing a method for connecting an optical waveguide and an optical semiconductor device of a second conventional example.

In FIG. 12, an optical semiconductor device 228 is loaded onto a silicon substrate 225. In the optical semiconductor device 228, first markers having parallelogram-shape which allow an infrared ray R (FIG. 13) to transmit through are perforated, and second markers 238 are formed on a bottom surface. An infrared ray R is shielded in other regions than the region of the markers 238. In the silicon substrate 225, a rectangular-shaped holes, which allows the infrared ray R to transmit through, are perforated, and first markers 237 are formed. The infrared ray R is shielded in other regions than the region of the markers 237.

FIG. 13 is a perspective view showing an apparatus for connecting the optical waveguide and the optical semiconductor device of the second conventional example.

In FIG. 13, the infrared ray R is irradiated upward from an infrared-ray source 222 located below the silicon substrate 225 and the optical semiconductor device 228, and an image of the infrared ray R having transmitted through the silicon substrate 225 and the optical semiconductor device 228 is photographed by an infrared-ray camera 231.

FIG. 14 is a schematic view showing an infrared-ray-photographed image in the method for connecting the optical guide and the optical semiconductor device of the second conventional example.

Based on the photographed image as shown in FIG. 14, a deviation of the first and second markers 236 and 238 from each other is obtained, and a parts-moving stage 226 (FIG. 13) and a substrate moving stage 223 (FIG. 13) are controlled so as to make coincident the first and second markers 236 and 238 with each other, thus positioning the silicon substrate 225 and the optical semiconductor device 228.

Moreover, the image of the infrared ray R having transmitted through the first and second markers 236 and 238 is taken out by a half mirror 233 (FIG. 13), and measured by an optical intensity detector 235 (FIG. 13). The silicon substrate 225 and the optical semiconductor device 228 are fixed at a position where an intensity of the image comes to be maximum or minimum, whereby a positioning precision of the silicon substrate 225 and the optical semiconductor device 228 is increased.

As a still another conventional example, in Japanese Patent Laid-Open No. Hei 9 (1997)-205255, published on Aug. 5, 1997, an optical semiconductor device using an passive alignment method, in which areal centers of gravity of alignment marks provided respectively on a semiconductor laser chip and a sub-mount are made to be coincident with each other, and a method for manufacturing the same are disclosed.

Moreover, in Japanese Patent Laid-Open No. Hei 9 (1997)-292542, published on Nov. 11, 1997, an optical part mounting substrate using a passive alignment method, in which alignment marks provided respectively on a semiconductor laser chip and an optical part fixing member are detected thus mounting one on another, is disclosed.

However, the connection methods for the optical waveguide and the optical semiconductor device in the conventional examples have the following problems.

In the first conventional example shown in FIG. 10, when a working error exists on an outgoing surface 102b of the optical semiconductor device 102, a distance from the outgoing surface 102b of the optical semiconductor device 102 to an incident surface 104a of the optical fiber 104 shifts from a designed distance. Thus, an optical coupling coefficiency of the optical semiconductor device 102 and the optical fiber 104 reduces.

The reason is as follows. Specifically, when the optical semiconductor device 102 such as a laser diode is manufactured, after markers 161 and 162 are formed, the outgoing surface 102b is formed by performing a cleavage processing for the optical semiconductor device 102. Since this cleavage processing is performed in such manner that a breakable semiconductor is split so as to obtain the outgoing surface 102b, a working error of the outgoing surface 102b with respect to the markers 161 and 162 cannot be made to be 10 $\mu$m or less. On the other hand, in the case of the optical semiconductor device 102 for which a high optical output power and a high optical coupling coefficiency are needed, a distance from the outgoing surface 102b of the optical semiconductor device 102 to the incident surface 104a of the optical fiber 104 must be reduced to about 3 $\mu$m. It is nevertheless difficult to meet the requirement as long as the cleavage processing is adopted.

Moreover, the distance from the outgoing surface 102b of the optical semiconductor device 102 to the incident surface 104a of the optical fiber 104 cannot be obtained as designed, and there is a problem that the optical coupling coefficiency is low.

The reason is as follows. Specifically, if a slit 110 for deciding the position of an incident surface 107a of a sub substrate 107 is formed by grinding the sub substrate 107 in a mechanical working manner, a working error of 5 $\mu$m or more is created. Similarly, even if the incident surface 104a of the optical fiber 104 is polished so as to smooth it using a blade saw, the working error of 5 $\mu$m or more is created. Specifically, the working error of 10 $\mu$m or more in total exists.

There have been these problems in any of the foregoing conventional examples.

Any of the foregoing conventional examples discloses simply the technology in which the areal center of gravity of the alignment marks are made to be coincident with each other, or the technology in which the positioning is controlled based on the overlapping state of the alignment markers. When the foregoing working error of the outgoing surface exists or the foregoing working error of the incident surface exists, any of the foregoing conventional examples cannot aim at removing the working errors, and does not disclose concrete method to remove the working errors.

Accordingly, any of the foregoing conventional examples cannot remove the foregoing working errors in principle.

SUMMARY OF THE INVENTION

The object of the present invention is to provide a method for connecting an optical waveguide and an optical semiconductor device and an apparatus for connecting the optical waveguide and the optical semiconductor device, capable of removing a working error and getting a high optical coupling coefficiency.

A first aspect of the method is that: a method for connecting an optical waveguide for guiding light and an optical semiconductor device having an outgoing surface for emitting the light, the optical waveguide being formed in a first region on a top surface of a substrate, on which a pair of first positioning marks are formed for transmitting or shielding an infrared ray only at specified spots in a second region adjacent to the first region, and the optical semiconductor device having a bottom surface on which a pair of second positioning marks for transmitting or shielding the infrared ray are formed thereof, the second positioning marks being concentric and having a different diameter from that of the first positioning marks and an inverted pattern shape to that of the first positioning marks. The method consisting of the steps of: moving the optical semiconductor device to the substrate so as to overlap the pair of the first positioning marks and the pair of the second positioning marks; obtaining an actual distance from the outgoing surface to the pair of the second positioning marks, based on an image photographed by allowing the infrared ray to transmit through the substrate and the optical semiconductor device; obtaining an error between the actual distance and a designed distance previously set, by subtracting the designed distance between the outgoing surface of the optical semiconductor device and the pair of the second positioning marks from the actual distance; moving the pair of the second positioning marks relative to the pair of the first positioning marks by a quantity equal to the error so as to cancel the error; and jointing the optical semiconductor device to the substrate.

A second aspect of a method is that: a method for connecting an optical waveguide and an optical semiconductor device, the optical waveguide being laid in a groove formed on a top surface of a substrate on which a pair of first positioning marks are formed for transmitting or shielding an infrared ray only at specified spots and having one end surface thrusted to a thrust end surface, that is one end of the groove, so as to be positioned, and the optical semiconductor device having a bottom surface, in which a pair of second positioning marks for transmitting or shielding the infrared ray are formed, the second positioning marks being concentric and having a different diameter from that of the first positioning marks and an inverted pattern shape to that of the first positioning marks. The method consisting of the steps of: moving the optical semiconductor device to the substrate so as to overlap the pair of the first positioning marks and the pair of the second positioning marks; obtaining an actual distance from an outgoing surface of the optical semiconductor device to the thrust end surface, based on an image photographed by allowing the infrared ray to transmit through the substrate and the optical semiconductor device; obtaining an error between the actual distance and a designed distance previously set, by subtracting the designed distance between the outgoing surface of the optical semiconductor device and the thrust end surface of the slit from the actual distance; moving the pair of the second positioning marks relative to the pair of the first positioning marks by a quantity equal to the error so as to cancel the error; and jointing the optical semiconductor device to the substrate.

A first aspect of the apparatus is that: an apparatus for connecting an optical waveguide for guiding light and an optical semiconductor device having an outgoing surface for emitting the light, the optical waveguide being formed in a first region on a top surface of a substrate, on which a pair of first positioning marks are formed for transmitting or shielding an infrared ray only at specified spots in a second region adjacent to the first region, and the optical semiconductor device having a bottom surface on which a pair of second positioning marks for transmitting or shielding the infrared ray are formed thereof, the second positioning marks being concentric and having a different diameter from that of the first positioning marks and an inverted pattern shape to that of the first positioning marks. The apparatus consisting of: a stage for moving relatively the substrate and the optical semiconductor device; a light source for irradiating the infrared ray; a camera for photographing an image formed by the infrared ray irradiated from the light source and transmitted through the substrate and the optical semiconductor device; and a control unit for controlling the stage based on the image from the camera. The control unit drives the stage so as to overlap the pair of the first positioning marks and the pair of the second positioning marks; obtains an actual distance from the outgoing surface to the pair of the second positioning marks, based on the image photographed from the camera; obtains an error between the actual distance and a designed distance previously set, by subtracting the designed distance between the outgoing surface of the optical semiconductor device and the pair of the second positioning marks from the actual distance; and moves the pair of the second positioning marks relative to the pair of the first positioning marks by driving the stage by a quantity equal to the error so as to cancel the error.

A second aspect of an apparatus is that: an apparatus for connecting an optical waveguide and an optical semiconductor device, the optical waveguide being laid in a groove formed on a top surface of a substrate on which a pair of first positioning marks are formed for transmitting or shielding an infrared ray only at specified spots and having one end surface thrusted to a thrust end surface, that is one end of the groove, so as to be positioned, and the optical semiconductor device having a bottom surface, in which a pair of second positioning marks for transmitting or shielding the infrared ray are formed, the second positioning marks being concentric and having a different diameter from that of the first positioning marks and an inverted pattern shape to that of the first positioning marks. The apparatus consisting of: a stage for moving relatively the substrate and the optical semiconductor device; a light source for irradiating the infrared ray; a camera for photographing an image formed by the infrared ray irradiated from the light source and transmitted through the substrate and the optical semiconductor device; and a control unit for controlling the stage based on the image from the camera. The control unit drives the stage so as to overlap the pair of the first positioning marks and the pair of the second positioning marks; obtains an actual distance from the pair of the second positioning marks to the thrust end surface, based on the image from the camera; obtains an error between the actual distance and a designed distance previously set, by subtracting the designed distance between the pair of the second positioning marks of the optical semiconductor device and the thrust end surface of the slit from the actual distance, and moves the pair of the second positioning marks relative to the pair of the first positioning marks by driving the stage by a quantity equal to the error so as to cancel the error.

In the conventional examples, the relative positions of the substrate and the optical semiconductor device are controlled so that first and second positioning marks are made to be simply coincident with each other. Compared to the conventional examples, according to the methods and the apparatuses of the present invention as described above, the present invention is characterized as follows. The first and second positioning marks are once overlapped, and the actual distance from the positioning mark of the optical semiconductor device to either the outgoing surface of the optical semiconductor device or the thrust end surface of the slit of the substrate is measured. Then an error is obtained by subtracting a designed distance previously set from the actual distance obtained, and the optical semiconductor device is moved by the quantity equal to the error so as to cancel the error, thus jointing the optical semiconductor device to the optical waveguide substrate.

Since the constitutions and the technique described above are adopted in the present invention, the distance between the outgoing surface of the optical semiconductor device and the incident surface of the optical waveguide can be always made to be coincident wits the designed distance precisely.

BRIEF DESCRIPTION OF THE DRAWINGS

For a more complete understanding of the present invention and advantages thereof, reference is now made to the following description taken in conjunction with the accompanying drawings.

FIG. 10 is a perspective view showing a method for connecting an optical waveguide and an optical semiconductor device of a first conventional example.

FIG. 13 is a schematic side view showing an apparatus for connecting the optical waveguide and the optical semiconductor device of the second conventional example.

FIG. 14 is a schematic view showing an infrared-ray-photographed image in the method for connecting the optical waveguide and the optical semiconductor device of the second conventional example.

DETAILED DESCRIPTION OF THE PREFERRED EMBODIMENTS (First Embodiment)

As a first embodiment, an optical module in which an optical waveguide 5 is formed on an optical waveguide substrate 1 will be described.

Figure 1:
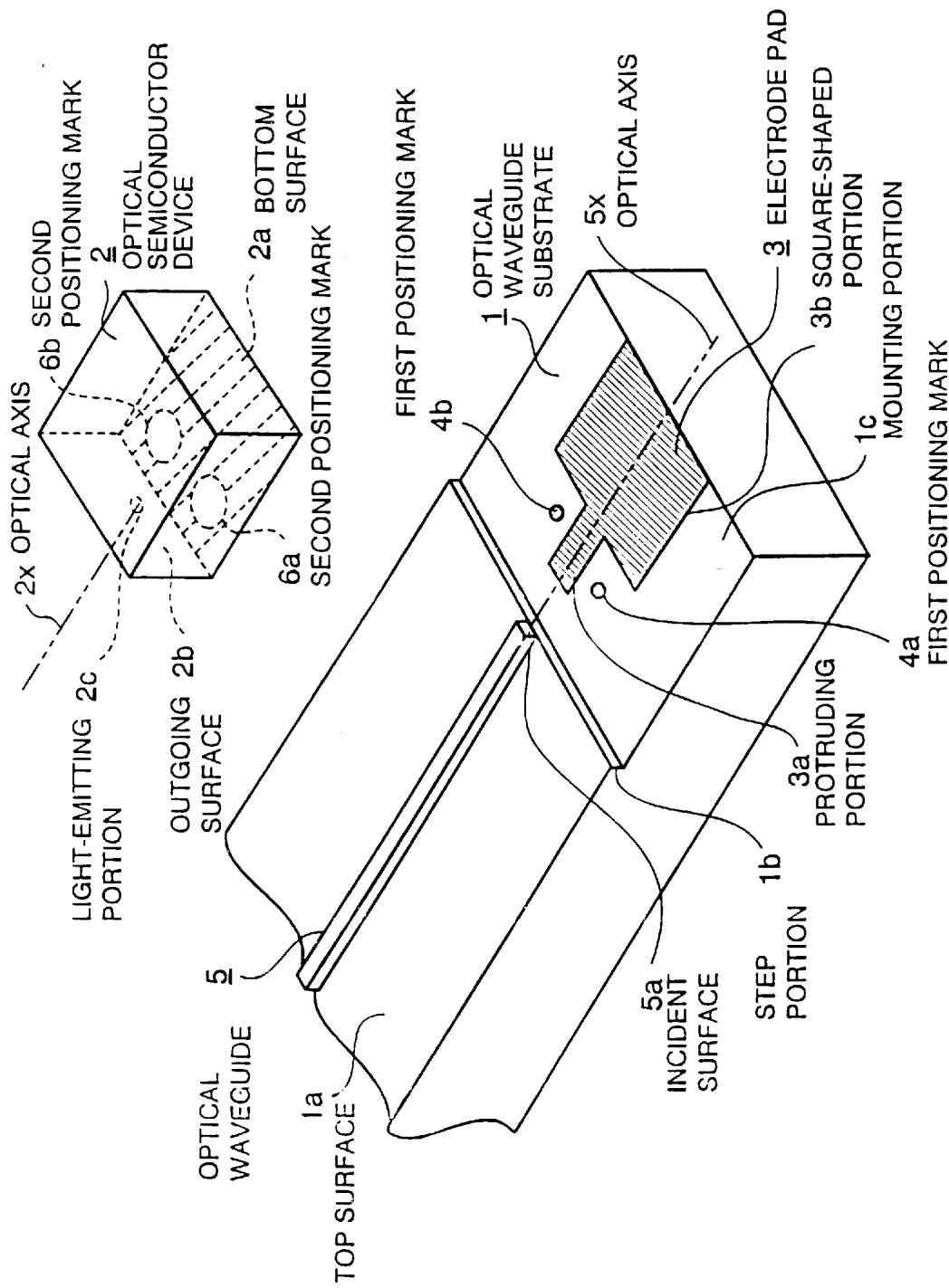
FIG. 1 is a perspective view showing a structure of connecting an optical waveguide and an optical semiconductor device according to a first embodiment of the present invention.

FIG. 1 is a perspective view showing a structure of connecting an optical waveguide and an optical semiconductor device of a first embodiment of the present invention.

In FIG. 1, the optical waveguide substrate 1 is a plane-shaped substrate formed of a silicon material and the like. The optical waveguide 5 made of a transparent material such as $SiO_2$ is formed on a top surface 1a of the optical waveguide substrate 1 by coating the optical waveguide 5 thereon by means of a Chemical Vapor Deposition (CVD) method or the like. The optical waveguide 5 takes a straight-line shape.

On a tip of the optical waveguide 5, an incident surface 5a for allowing light to be incident thereonto is formed along an optical axis 5x so as to be perpendicular to the optical waveguide 5. A step portion 1b is formed at a position of the top surface 1a of the optical waveguide substrate 1 so as to cross the incident surface 5a. A mounting portion 1c is formed on a portion of the optical waveguide substrate 1 farther ahead of the tip of the optical waveguide 5, the step portion 1b intervening therebetween. On the surface of the mounting portion 1c, an electrode pad 3 which takes a rectangular shape having a protruding portion 3a in its center portion when viewed from the above is formed on an extended line of the optical waveguide 5, by a technique such as etching.

Moreover, first positioning marks 4a and 4b taking a round shape, which is formed of a thin film for shielding infrared ray R (FIG. 2), are formed on both sides of the protruding portion 3a of the electrode pad 3 so as to sandwich the protruding portion 3a therebetween.

In FIG. 1, the optical semiconductor device 2 is a semiconductor device which emits light such as a laser beam from a light-emitting portion 2c along an optical axis 2x, and a thin film for shielding the infrared ray R (FIG. 2) is formed on the entire surface of a bottom surface 2a thereof. In this thin film, regions formed by removing partially the thin film for shielding the infrared ray R, which surround the first positioning marks 4a and 4b of the optical waveguide substrate 1 and have a diameter larger than that of the first positioning marks 4a and 4b, are formed as second positioning marks 6a and 6b.

Note that an outline shape of a squared-shaped portion 3b excluding the protruding portion 3a from the region which takes a rectangular shape having a protruding portion 3a in its center portion on the optical waveguide substrate 1 is formed so as to fit it with an outline shape of the bottom surface 2a of the optical semiconductor device 2.

Moreover, in order to make coincident a vertical height of the optical axis 5x of the optical waveguide 5 with a vertical height of the optical axis 2x of the optical semiconductor device 2, the mounting portion 1c of the optical waveguide substrate 1 is formed by etching and the like to be somewhat lower than the region where the optical waveguide 5 is formed.

Figure 2:
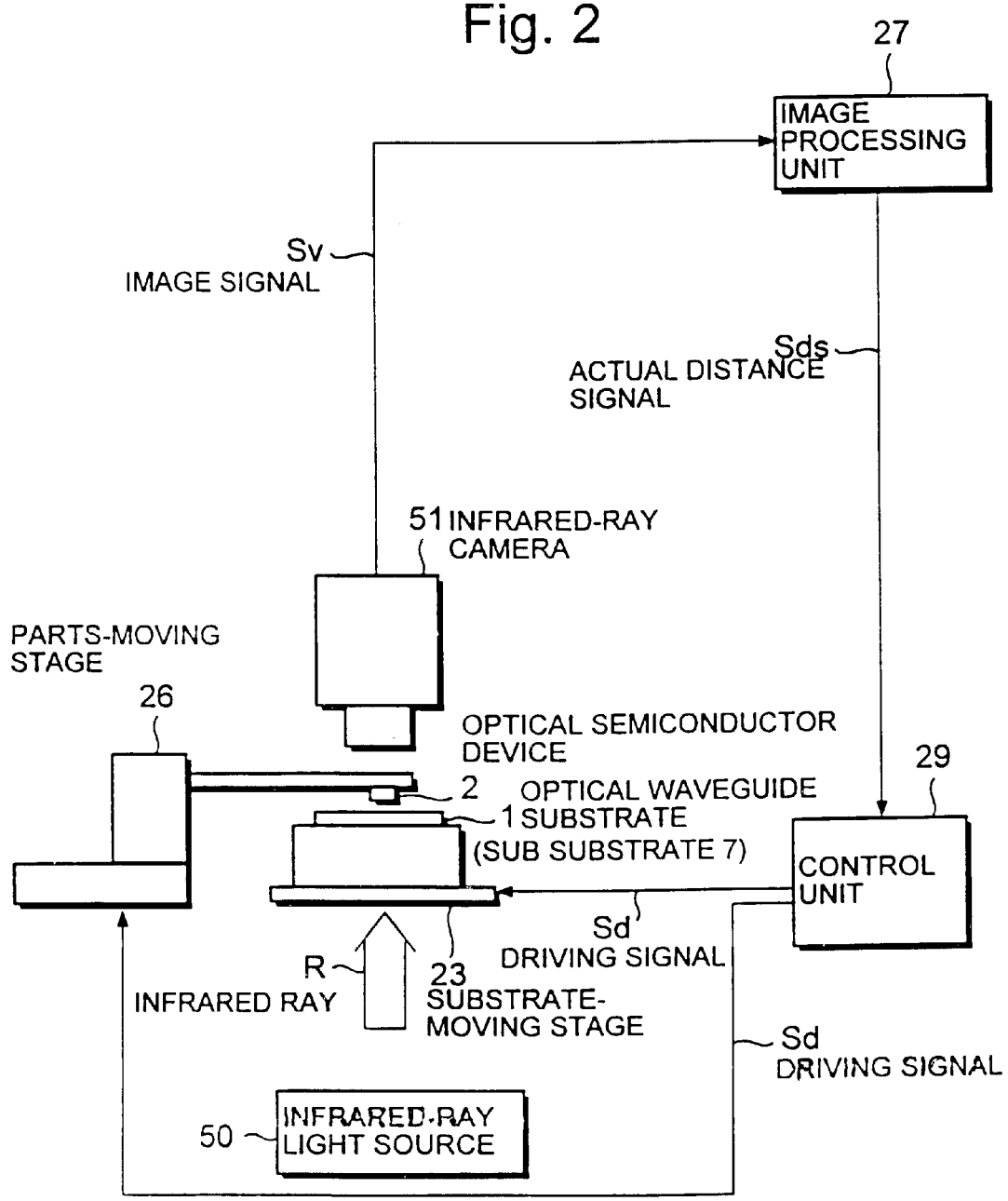
FIG. 2 is a schematic side view showing a structure of an apparatus for realizing the apparatus for connecting the optical waveguide and the optical semiconductor device according to the FIG. 1 embodiment.

FIG. 2 is a schematic side view showing a structure of an apparatus for connecting the optical waveguide and the optical semiconductor device according to the FIG. 1 embodiment.

The connection apparatus shown in FIG. 2 constitutes of a substrate-moving stage 23 for mounting the optical waveguide substrate 1 thereon, a parts-moving stage 26 for holding the optical semiconductor device 2 thereunder, an image processing unit 27, a control unit 29, an infrared-ray light source 50 and an infrared-ray camera 51.

The substrate-moving stage 23 is a plane stage placed on a horizontal plane and mounts the optical waveguide substrate 1 thereon. The substrate-moving stage 23 moves the optical waveguide substrate 1 placed thereon to an arbitrary position in response to a drive signal Sd from the control unit 29.

The parts-moving stage 26 is a three-dimensional stage which holds the optical semiconductor device 2 with its arm at a tip bottom surface thereof and is movable with a degree of freedom in X, Y and Z-directions. The parts-moving stage 26 moves the optical semiconductor device 2 held with its arm to an arbitrary position on the horizontal plane in response to the drive signal Sd from the drive unit 29, and moves the optical semiconductor device 2 vertically.

The image processing unit 27 obtains positions between specified images in a photographed image based on an image signal Sv from the infrared-ray camera 51, and outputs it as an actual distance signal Sds.

The control unit 29 performs a computation based on an actual distance L (FIG. 3) indicated by the actual distance signal Sds and a designed distance Lo (FIG. 3) previously stored therein, and outputs the drive signal Sd to the substrate-moving stage 23 and the parts-moving stage 26.

The infrared-ray light source 50 is provided below the substrate-moving stage 23 so as to face upward, and irradiates the infrared ray R upward.

The infrared-ray camera 51 is provided above the parts-moving stage 26 so as to face downward, and photographs the infrared ray R having transmitted through the optical waveguide substrate 1 and the optical semiconductor device 2, thus outputting it as the image signal Sv to the image processing unit 27.

Next, a method for connecting the optical waveguide and the optical semiconductor device of this embodiment will be described.

Figure 3:
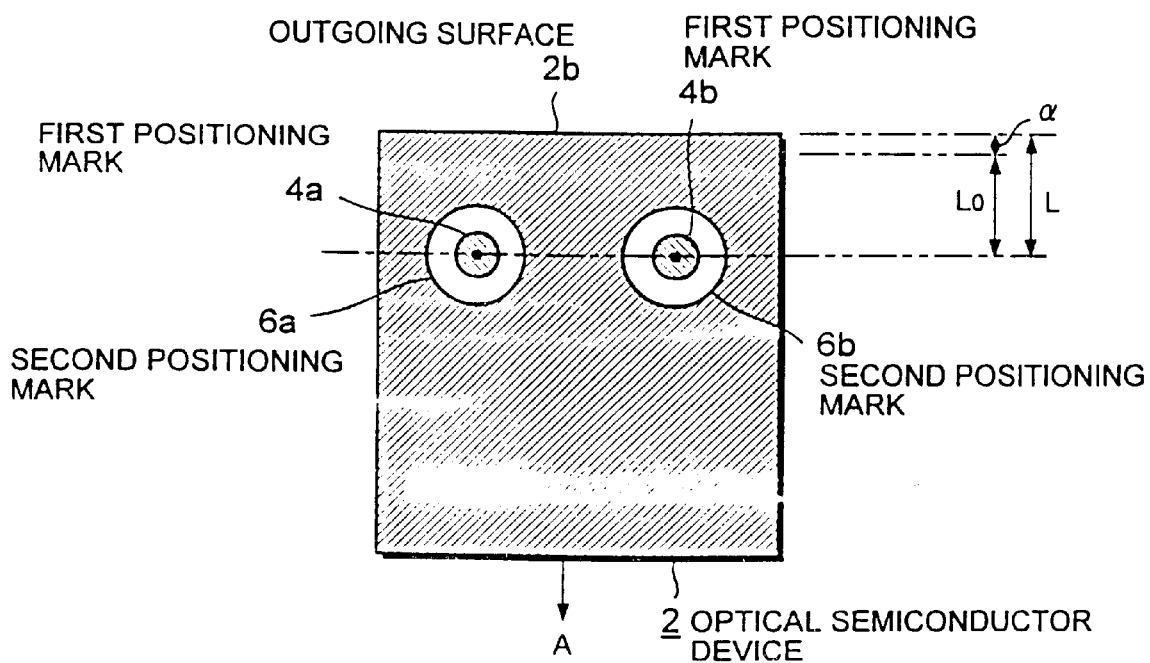
FIG. 3 is a schematic view showing a photographed image at the time of starting a method for connecting the optical waveguide and the optical semiconductor device according to the FIG. 1 embodiment.

FIG. 3 is a schematic view showing a photographed image at the time of starting a method for performing a method for connecting the optical waveguide and the optical semiconductor device according to the FIG. 1 embodiment.

Figure 4:
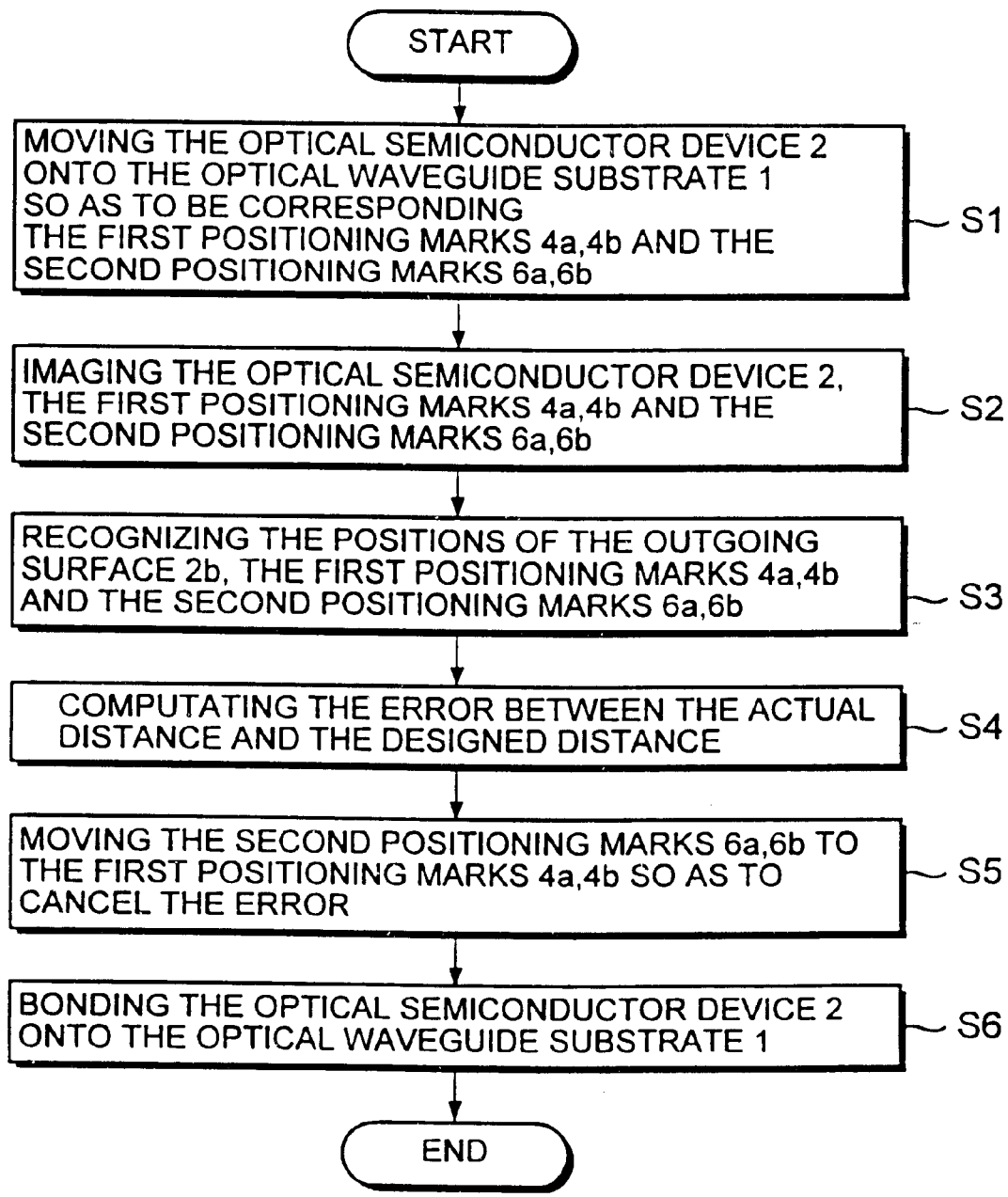
FIG. 4 is a flowchart showing processes in the method for connecting the optical waveguide and the optical semiconductor device according to the FIG. 1 embodiment.

FIG. 4 is a flowchart showing processes in the method of connecting the optical waveguide and the optical semiconductor device according to the FIG. 1 embodiment.

In FIG. 3, the L denotes an actual distance from the outgoing surface 2b of the optical semiconductor device 2 to centers of the positioning marks 4a, 4b, 6a and 6b. The Lo denotes a designed distance from the outgoing surface 2b of the optical semiconductor device 2 to the centers of the positioning marks 4a, 4b, 6a and 6b. The α denotes a working error of the outgoing surface 2b of the optical semiconductor device 2.

First, the optical semiconductor device 2 is moved onto the optical waveguide substrate 1 so that each of the centers of the first positioning marks 4a and 4b of the optical waveguide substrate 1 is made to be coincident with each of the centers of the second positioning marks 6a and 6b of the optical semiconductor device 2 respectively (step S1).

Next, as shown in FIG. 2, the infrared ray R is irradiated onto the bottom surface of the optical waveguide substrate 1 from the infrared-ray light source 50 disposed below the optical waveguide substrate 1 so as to face upward. The infrared ray R is allowed to transmit through the optical waveguide substrate 1 and the optical semiconductor device 2.

The infrared ray R having transmitted through the optical waveguide substrate 1 and the optical semiconductor device 2 is photographed by the infrared-ray camera 51 disposed above the optical semiconductor device 2 so as to face downward. The photographed infrared ray R is supplied to the image processing unit 27 as the image signal Sv (step S2).

Thus, as shown in FIG. 3, the positioning marks 4a, 4b, 6a, 6b and the outgoing surface 2b of the optical semiconductor device 2 are photographed.

The image processing unit 27 (FIG. 2) performs an image processing such as a binary processing based on the photographed image indicated by the image signal Sv (FIG. 2), and detects the positions of the positioning marks 4a, 4b, 6a and 6b and the position of the outgoing surface 2b of the optical semiconductor device 2 (step S3).

Subsequently, based on the detected positions of the positioning marks 4a, 4b, 6a and 6b and the outgoing surface 2b, the image processing unit 27 (FIG. 2) obtains the actual distance L from the center of the positioning marks 4a, 4b, 6a and 6b to the outgoing surface 2b of the optical semiconductor device 2, and outputs it as the actual distance signal Sds (FIG. 2).

The control unit 29 (FIG. 2) subtracts the designed distance Lo between the centers of the positioning marks 4a, 4b, 6a and 6b and the outgoing surface 2b of the optical semiconductor device 2 from the actual distance L indicated by the actual distance signal Sds, thus obtaining an error α (=L−Lo). Note that the designed distance Lo is previously set in the control unit 29 (FIG. 2).

Next, in FIG. 2, the control unit 29 generates the drive signal Sd for driving the substrate-moving stage 23 and the parts-moving stage 26 by a quantity equal to the error α so as to cancel the error α (FIG. 3). Note that the drive signal Sd may drive any one of the substrate-moving stage 23 and the parts-moving stage 26 or may drive the both of them. The control unit 29 then outputs the drive signal Sd (step S4).

The drive signal Sd is supplied to the substrate-moving stage 23 and the parts-moving stage 26, or the drive signal Sd is supplied to any one of the substrate-moving stage 23 and the parts-moving stage 26. The parts-moving stage 26 is moved by the quantity equal to the error α (FIG. 3) in a direction of the arrow A (FIG. 3) so as to cancel the error α (FIG. 3). Alternatively, the substrate-moving stage 23 is moved by the quantity equal to the error α (FIG. 3) in a direction opposite to the arrow A (FIG. 3). Still alternatively, by combining the means above, the parts-moving stage 26 and the substrate-moving stage 23 are relatively moved with respect to each other (step S5).

Figure 5:
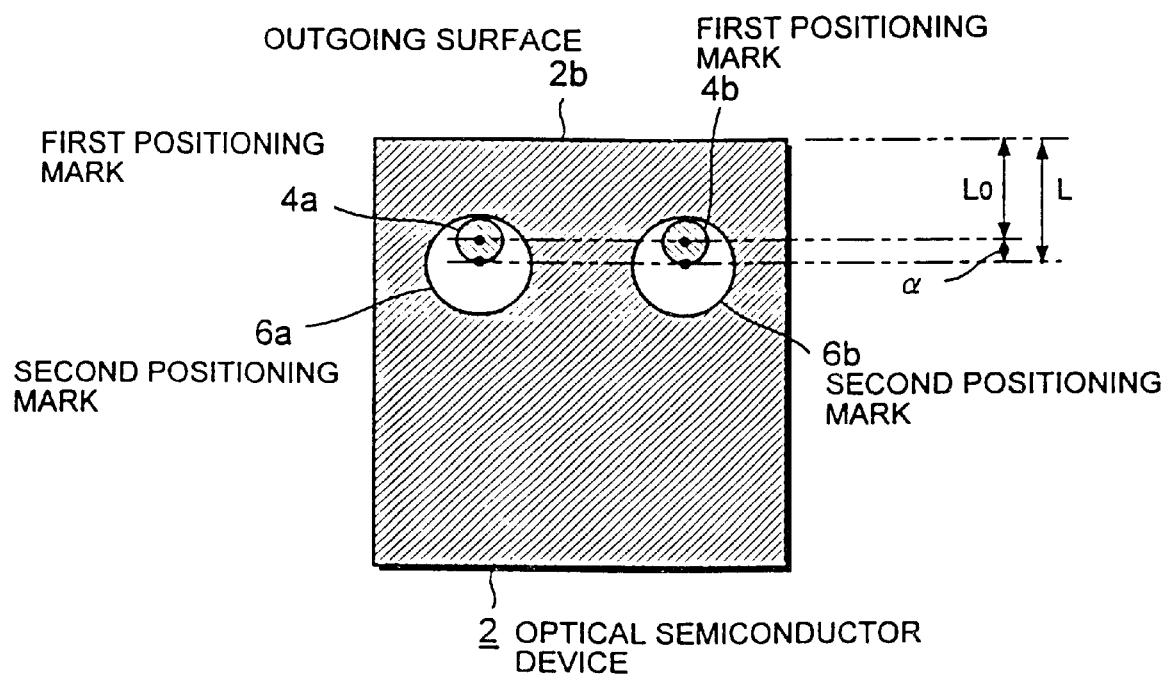
FIG. 5 is a schematic view showing a photographed image at the time of completing the method for performing a method for connecting the optical waveguide and the optical semiconductor device according to the FIG., 1 embodiment.

FIG. 5 is a schematic view showing a photographed image at the time of completing the method for performing a method for connecting the optical waveguide and the optical semiconductor device according to the FIG. 1 embodiment.

As shown in FIG. 5, since the second positioning marks 6a and 6b of the optical semiconductor device 2 are moved relative to the first positioning marks 4a and 4b of the optical waveguide substrate 1 by the quantity equal to the error α in the direction to cancel the errors α, a distance between the incident surface 5a (FIG. 1) of the optical waveguide 5 (FIG. 1) and the outgoing surface 2b (FIG. 1) of the optical semiconductor device 2 (FIG. 1) will be made to be coincident with the designed distance accurately.

Finally, the parts-moving stage 26 is made to descend so as to mount the optical semiconductor device 2 on the optical waveguide substrate 1, thus jointing the optical semiconductor device 2 and the optical waveguide substrate 1 to each other by a method such as soldering and the like (step S6).

As described above, according to this embodiment, the optical semiconductor device 2 is moved onto the optical waveguide substrate 1, and the infrared ray R is allowed to transmit through the optical semiconductor device 2 and the optical waveguide substrate 1. The actual distance L between the outgoing surface 2b and the centers of the positioning marks 4a, 4b, 6a and 6b is obtained, and the optical semiconductor device 2 is moved by the quantity equal to the error α between the actual distance L and the designed distance Lo previously set, in the direction to cancel the error α. Thereafter, the optical semiconductor device 2 and the optical waveguide substrate 1 are jointed to each other.

Thus, the working error α of the outgoing surface 2b of the optical semiconductor device 2 is cancelled, and the optical axis 2x of the optical semiconductor device 2 and the optical axis 5x of the optical waveguide 5 will be made to be coincident with each other accurately.

(Second Embodiment)

As a second embodiment, an optical module using an optical fiber 9 as the optical waveguide will be described. Since the optical semiconductor device 2 and the apparatus for connecting the optical semiconductor device 2 and the optical waveguide substrate 1 shown in FIG., 2 have the same structure as those in the first embodiment, descriptions for them is omitted. In this embodiment, the optical waveguide substrate 1 of FIG. 2 is replaced by a sub substrate 7.

Figure 6:
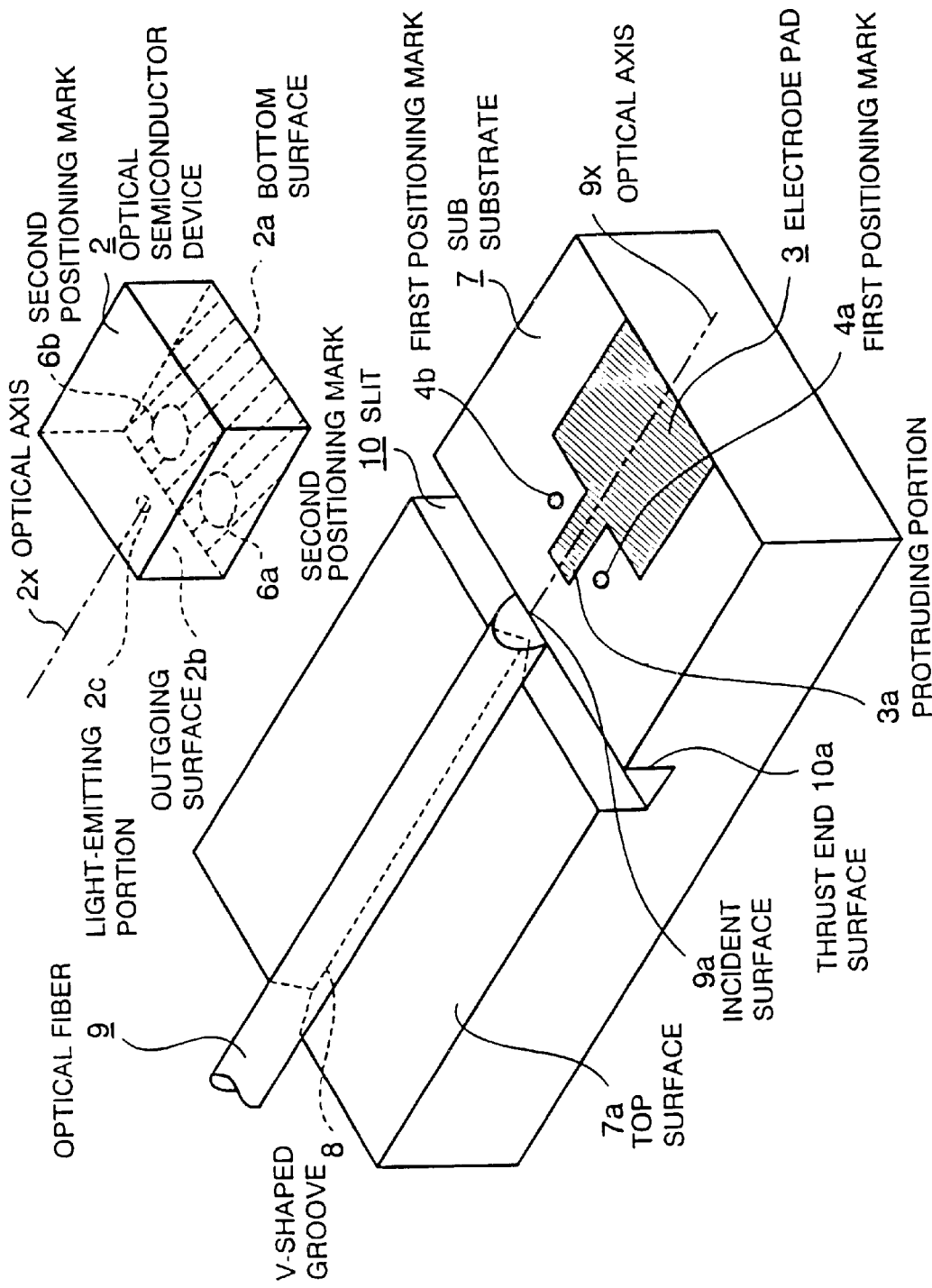
FIG. 6 is a perspective view showing a structure of connecting an optical waveguide and an optical semiconductor device according to a second embodiment of the present invention.

FIG. 6 is a perspective view showing a structure of connecting an optical waveguide and an optical semiconductor device according to a second embodiment of the present invention.

In FIG. 6, the sub substrate 7 is made of a silicon material and the like. An electrode pad 3 for mounting the optical semiconductor device 2 thereon is formed on one side of a top surface of the sub substrate 7. The electrode pad 3 takes a rectangular shape having a protruding portion 3a in its center portion by a technique such as etching. First positioning marks 4a and 4b having a round shape are formed on both sides of the protruding portion 3a of the electrode pad 3 so as to sandwich the protruding portion 3a.

A V-shaped groove 8 having a V character-shaped vertical cross section is formed on the other side of the top surface of the sub substrate 7 along the extended line of the protruding portion 3a of the electrode pad 3 by a technique such as anisotropic etching. The V-shaped groove 8 is formed to a depth so that a vertical height of an optical axis 9x of the optical fiber 9 and a vertical height of an optical axis 2x of the optical semiconductor device 2 are coincident with each other.

A slit 10 perpendicular to the V-shaped groove 8 is formed on an end surface of the V-shaped groove 8 of the electrode pad 3 side. The slit 10 is formed by processing the top surface 7a of the sub substrate 7 by cutting using a blade saw and the like and by polishing. An end surface of the slit 10 on the electrode pad 3 side serves as a thrust end surface 10a.

In the sub substrate 7 formed as described above, the optical fiber 9 is laid in the V-shaped groove 8, and the incident surface 9a that is an end surface of the optical fiber 9 on the electrode pad 3 side is thrusted to the thrust end surface 10a, whereby the optical fiber 9 is positioned in the V-shaped groove 8.

Figure 7:
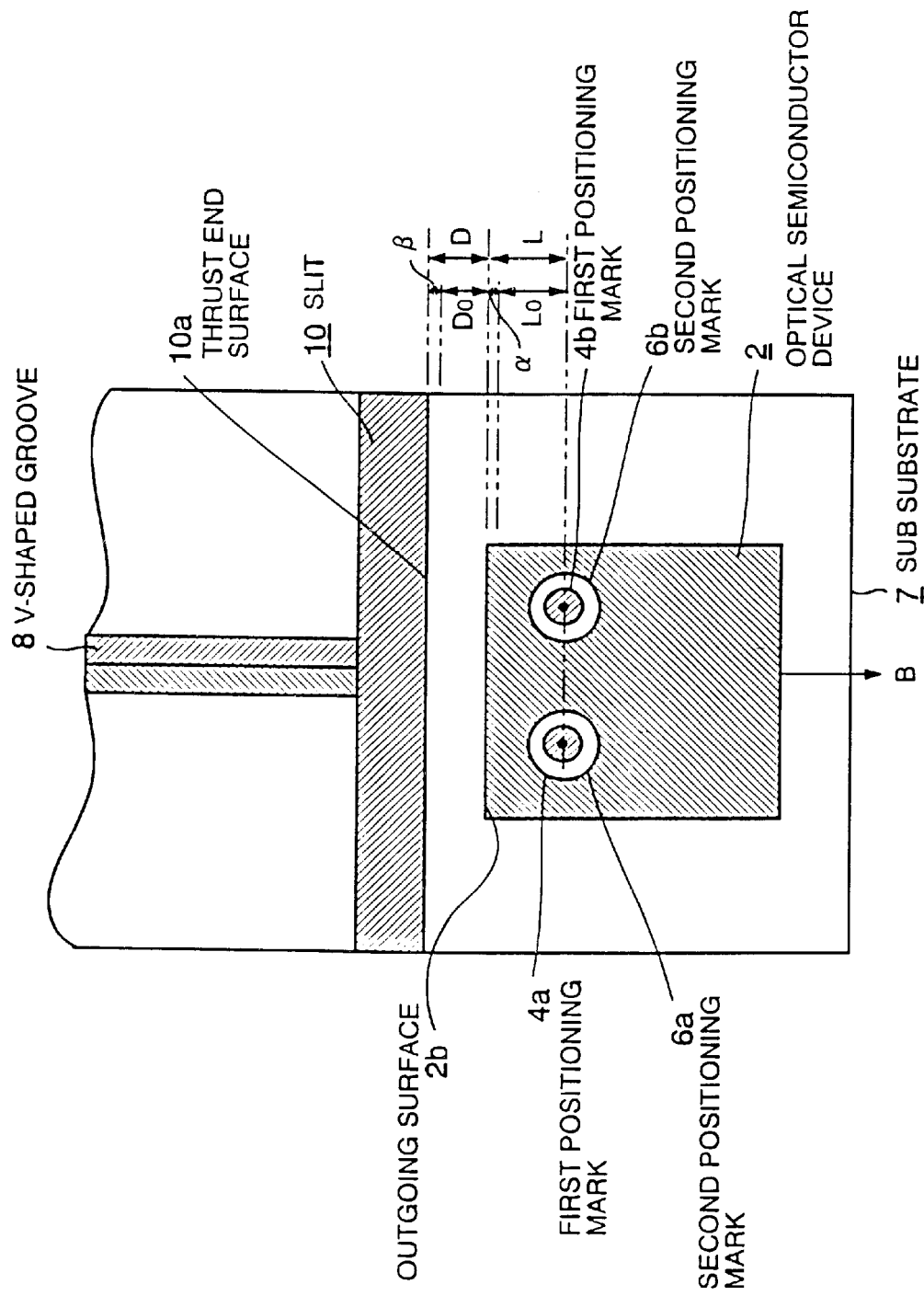
FIG. 7 is a schematic view showing a photographed image at the time of starting a method for connecting the optical waveguide and the optical semiconductor device according to the FIG. 6 embodiment.

FIG. 7 is a schematic view showing a photographed image at the time of starting a method for connecting the optical waveguide and the optical semiconductor device according to the FIG. 6 embodiment.

Figure 8:
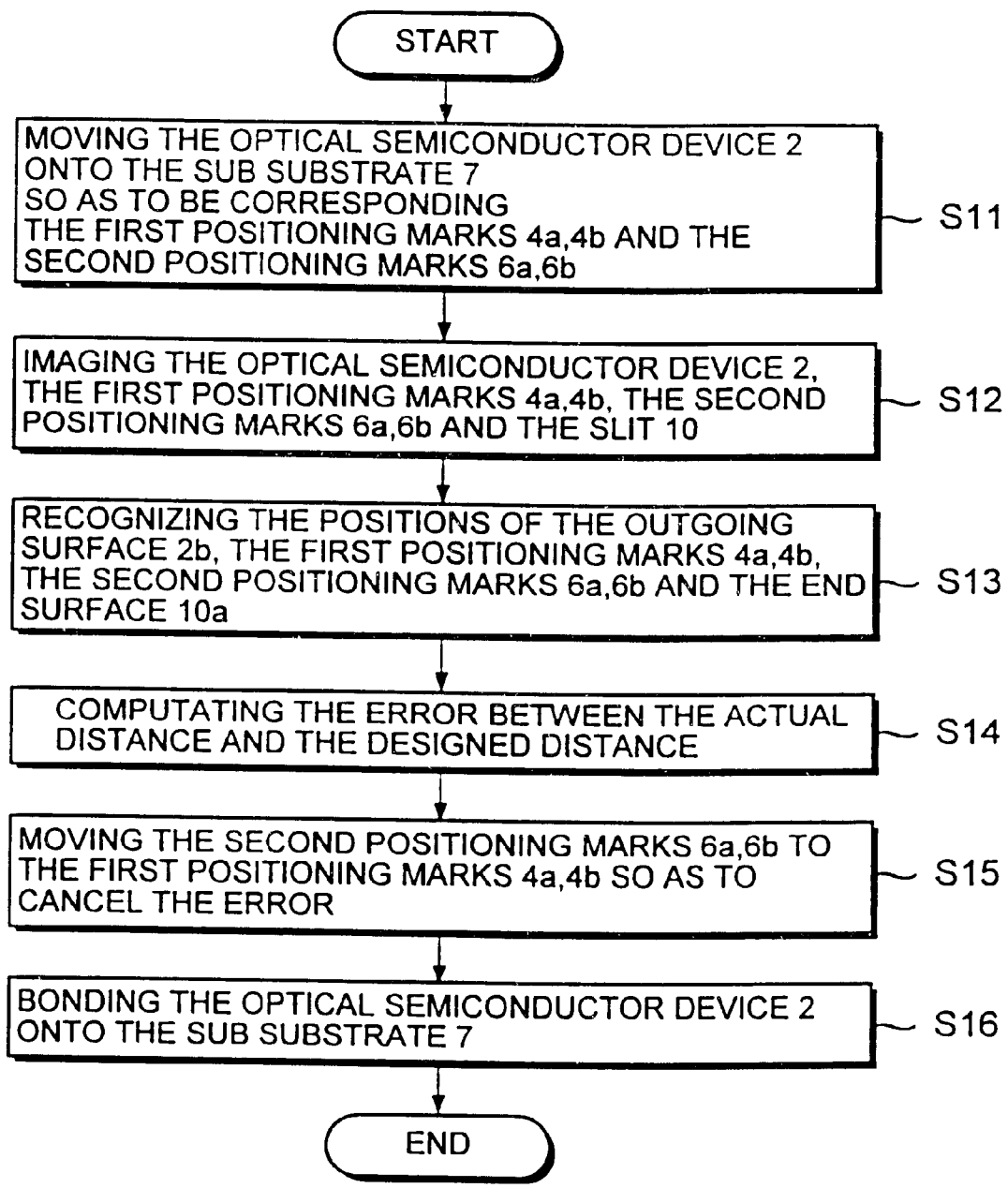
FIG. 8 is a flowchart showing processes in the method for connecting the optical waveguide and the optical semiconductor device according to the FIG. 6 embodiment.

FIG. 8 is a flowchart showing processes in the method for connecting the optical waveguide and the optical semiconductor device according to the FIG. 6 embodiment.

In FIG. 7, the L denotes an actual distance from the outgoing surface 2b of the optical semiconductor device 2 to centers of the positioning marks 4a, 4b, 6a and 6b. The Lo denotes a designed distance from the outgoing surface 2b of the optical semiconductor device 2 to the centers of the positioning marks 4a, 4b, 6a and 6b. The α denotes a working error of the outgoing surface 2b of the optical semiconductor device 2.

The D denotes an actual distance from the outgoing surface 2b of the optical semiconductor device 2 to the thrust end surface 10a of the slit 10. The Do denotes a designed distance from the outgoing surface 2b of the optical semiconductor device 2 to the thrust end surface 10a of the slit 10. The β denotes a working error of the thrust end surface 10a of the slit 10 of the sub substrate 7.

First, the optical semiconductor device 2 is moved onto the sub substrate 7 so that each of the centers of the first positioning marks 4a and 4b of the sub substrate 7 are made to be coincident with each of the centers of the second positioning marks 6a and 6b of the optical semiconductor device 2 respectively (step S11).

Next, as shown in FIG. 2, the infrared ray R is irradiated onto the bottom surface of the sub substrate 7 from the infrared-ray light source 50 disposed below the sub substrate 7 so as to face upward. The infrared ray R is allowed to transmit through the sub substrate 7 and the optical semiconductor device 2.

The infrared ray R having transmitted through the sub substrate 7 and the optical semiconductor device 2 is photographed by the infrared-ray camera 51 disposed above the optical semiconductor device 2 so as to face downward. The photographed infrared ray R is supplied to the image processing unit 27 as the image signal Sv (step S12).

Thus, as shown in FIG. 7, the positioning marks 4a, 4b, 6a, 6b, the outgoing surface 2b of the optical semiconductor device 2 and the slit 10 are photographed. Note that the whole of the slit 10 is photographed as a shadow. The reason is that since the slit 10 is formed by cutting processing, the bottom surface of the slit 10 is not a smooth but an uneven plane.

The image processing unit 27 (FIG. 2) performs an image processing such as a binary processing based on the photographed image indicated by the image signal Sv. The image processing unit 27 (FIG. 2) detects the position of the outgoing surface 2b of the optical semiconductor device 2, the positions of the positioning marks 4a, 4b, 6a and 6b and the position of the thrust end surface 10a of the slit 10, respectively (step S13).

Furthermore, the image processing unit 27 (FIG. 2) obtains the actual distance (L+D) from the centers of the positioning marks 6a, 6b of the optical semiconductor device 2 to the thrust end surface 10a a of the slit 10 by a method to count what quantity equal to the number of pixels indicating that spaces among the positions of the detected outgoing surface 2b, the detected positioning marks 4a, 4b, 6a and 6b and the thrust end surface 10a separate from each other. The image processing unit 27 (FIG. 2) outputs it as the actual distance signal Sds.

The control unit 29 (FIG. 2) subtracts the designed distance (Lo+Do) between the outgoing surface 2b of the optical semiconductor device 2 and the thrust end surface 10a of the slit 10 from the actual distance (L+D) indicated by the actual distance signal Sds (FIG. 2), thus obtaining an error (α+β)={(L+D)−(Lo+Do)}. Note that the designed distance (Lo+Do) is previously set in the control unit 29 (FIG. 2).

Next, in FIG. 2, the control unit 29 generates the drive signal Sd for driving the substrate-moving stage 23 and the parts-moving stage 26 by a quantity equal to the error (α+β) (FIG. 7) in a direction to cancel the error (α+β) (FIG., 7). Note that the drive signal Sd may drive any one of the substrate-moving stage 23 and the parts-moving stage 26 or may drive the both of them. The control unit 29 then outputs the drive signal Sd (step S14).

Figure 9:
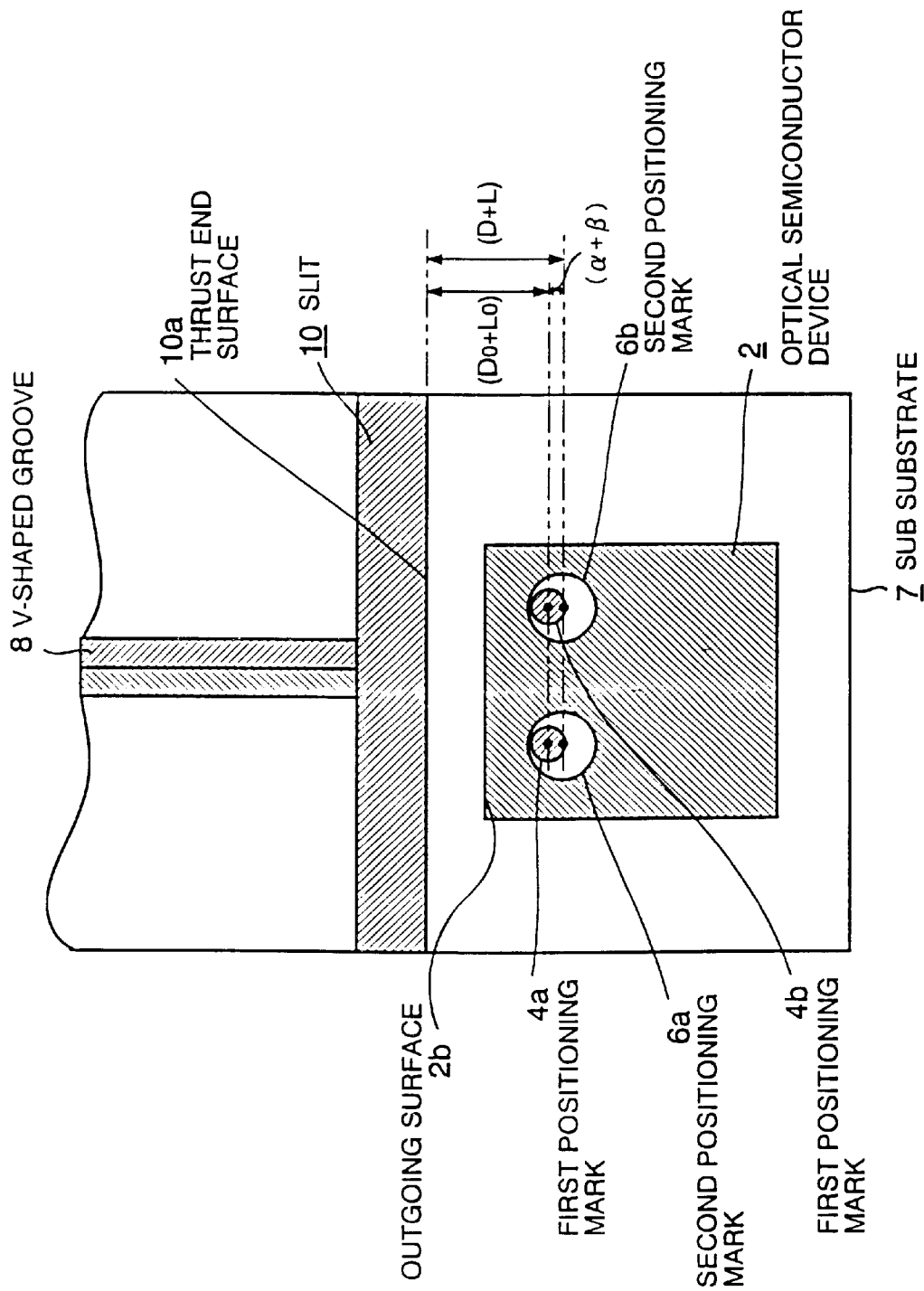
FIG. 9 is a schematic view showing a photographed image at the time of completing the method for performing a method for connecting the optical waveguide and the optical semiconductor device according to the FIG. 6 embodiment.
Figure 11:
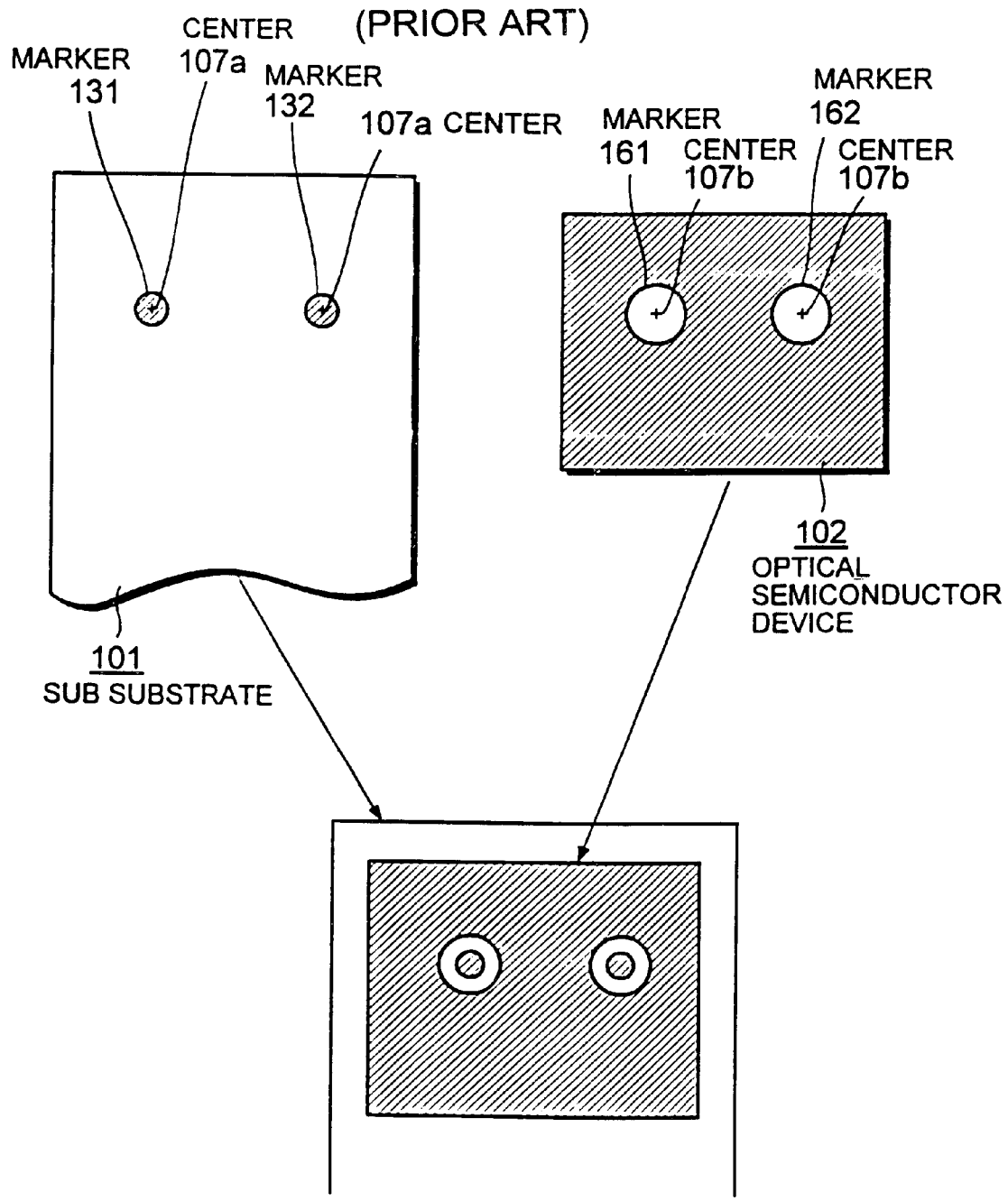
FIG. 11 is a schematic view showing a photographed image in the first conventional connection method.
Figure 12:
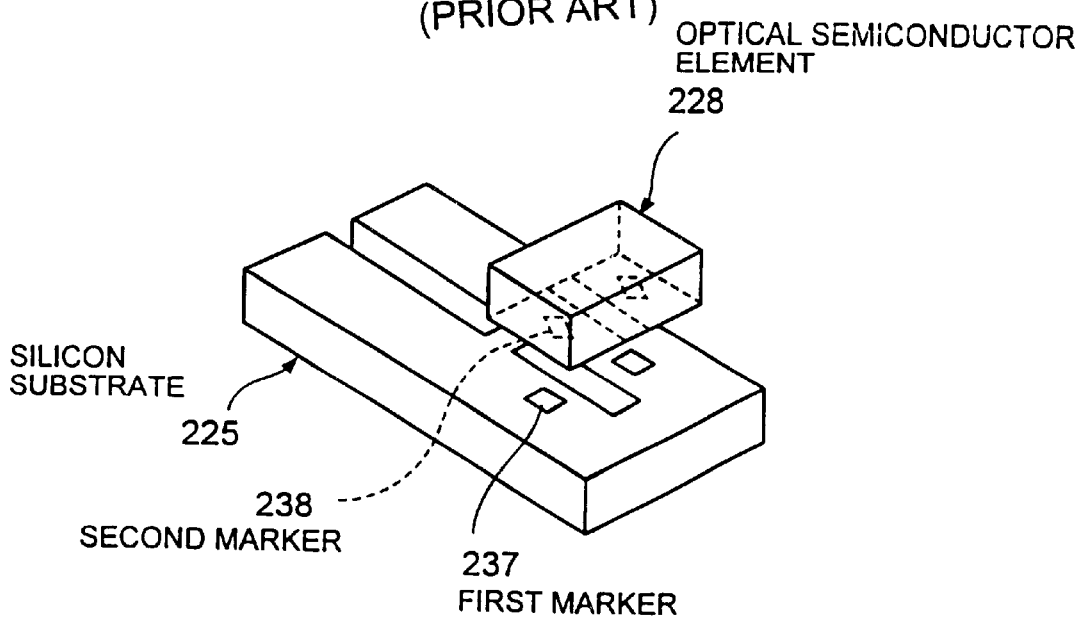
FIG. 12 is a perspective view showing a method for connecting an optical waveguide and an optical semiconductor device of a second conventional example.

The drive signal Sd is supplied to the substrate-moving stage 23 and the parts-moving stage 26, or the drive signal Sd is supplied to any one of the substrate-moving stage 23 and the parts-moving stage 26. The parts-moving stage 26 is moved by a quantity equal to the error (α+β) (FIG. 9) in a direction of the arrow B (FIG. 9) so as to cancel the error (α+β) (FIG. 9). Alternatively, the substrate-moving stage 23 is moved by the quantity equal to the error (α+β) (FIG. 9) in a direction opposite to the arrow B (FIG. 9). Still alternatively, by combining the means above, the parts-moving stage 26 and the substrate-moving stage 23 are relatively moved with respect to each other (step S15).

FIG. 9 is a schematic view showing a photographed image at the time of completing the method for connecting the optical waveguide and the optical semiconductor device according to the FIG. 6 embodiment.

In FIG. 9, since the optical semiconductor device 2 is moved relative to the sub substrate 7 by the quantity equal to the error (α+β) in the direction to cancel the error (α+β), the actual distance (L+D) between the thrust end surface 10a of the slit 10 of the sub substrate 7 and the outgoing surface 2b of the optical semiconductor device 2 will be made to be coincident with the designed distance accurately.

Finally, the parts-moving stage 26 (FIG. 2) is made to descend so as to mount the optical semiconductor device 2 on the sub substrate 7, and the optical semiconductor device 2 and the sub substrate 7 are jointed to each other by a method such as soldering and the like (step S16).

Thus, the working error α of the outgoing surface 2b of the optical semiconductor device 2 and the working error β of the thrust end surface 10a of the slit 10 are cancelled, and the distance between the outgoing surface 2b of the optical semiconductor device 2 and the incident surface 10a of the slit 10 will be made to be coincident with the designed distance accurately.

In the foregoing embodiments, the example in which the optical semiconductor device 2 is not rotated relative to the optical waveguide substrate 1 or the sub substrate 7 was described. In other words, these examples in which the distance between the first positioning mark 4a and the second positioning mark 6a is equal to the distance between the first positioning mark 4b and the second positioning mark 6b ware described. Compared to these examples, in the case where the optical semiconductor device 2 is rotated relative to the optical waveguide substrate 1 or the sub substrate 7, in other words, in the case where the distance between the first positioning mark 4a and the second positioning mark 6a is different from the distance between the first positioning mark 4b and the second positioning mark 6b, an error of the distance between the first positioning mark 4a and the second positioning mark 6a and an error of the distance between the first positioning mark 4b and the second positioning mark 6b are respectively obtained. By moving them so as to cancel all of these errors, the rotation of the optical semiconductor device 2 can be cancelled.

In the first embodiment, the error α was obtained from the optical waveguide substrate 1. In the second embodiment, the error (α+β) was obtained from the sub substrate 7. On the contrary, the error (α+β) may be obtained from the optical waveguide substrate 1, and the error α may be obtained from the sub substrate 7.

In the foregoing embodiments, the first positioning marks 4a and 4b shield the infrared ray R, and the second positioning marks 6a and 6b allows the infrared ray R to transmit therethrough. On the contrary, the first positioning marks 4a and 4b may allow the infrared ray R to transmit therethrough, and the second positioning marks 6a and 6b may shield the infrared ray R.

Although the infrared ray R was used as the light, which transmits through the optical waveguide substrate 1, the optical semiconductor device 2 and the sub substrate 7, any beam of light other than the infrared ray R may be employed. In this case, the transmission of the infrared ray and the shield thereof in each embodiment can be replaced with the transmission of this beam of light and the shield thereof. It suffices that instead of the infrared-ray light source 50 and the infrared-ray camera 51, a light source for emitting this beam of light and a camera for photographing this beam of light are used.

As described above, according to the present invention, the positioning marks are provided in both of the optical semiconductor device and one of the optical waveguide substrate and the sub substrate, and the infrared ray is allowed to transmit through them, thus obtaining the image. The obtained image is processed, and the actual distance from the centers of the positioning marks to either the outgoing surface of the optical semiconductor device or the thrust end surface of the optical waveguide is obtained. The optical semiconductor device and the optical waveguide are relatively moved by the quantity equal to the error between the actual distance and the designed distance in the direction to cancel this error. Then, the optical semiconductor device and the optical waveguide are jointed to each other. Accordingly, the working error of the outgoing surface of the optical semiconductor device and the working error of the incident surface of the optical waveguide are absorbed, and hence the distance between the outgoing surface of the optical semiconductor device and the incident surface of the optical waveguide is made to be coincident with the designed distance accurately. Then, the optical semiconductor device and the optical waveguide are joined to each other. Thus, the optical coupling coefficient can be significantly increased.

Moreover, the positioning marks are formed in both of the optical semiconductor substrate and one of the optical waveguide substrate or the sub substrate, and the image obtained by allowing the infrared ray to transmit through them is processed, thus obtaining the actual distance from the centers of the positioning marks on the optical semiconductor device to either the outgoing surface of the optical semiconductor device or the thrust end surface of the optical waveguide. The optical semiconductor device and the optical waveguide are relatively moved by the quantity equal to the error between the actual distance and the designed distance in the direction to cancel the error, and then the optical semiconductor device and the optical waveguide are jointed to each other. Accordingly, the working error of the outgoing surface of the optical semiconductor device and the working error of the incident surface of the optical waveguide are absorbed, and hence the distance between the outgoing surface of the optical semiconductor device and the thrust end surface of the optical waveguide is made to be coincident with the designed distance accurately. Thus, the optical coupling coefficient can be significantly increased.

Although the preferred embodiments of the present invention have been described in detail, it should be understood that various changes, substitutions and alternations can be made therein without departing from spirit and scope of the inventions as defined by the appended claims.

What is claimed is:

1. A method for connecting an optical waveguide for guiding light and an optical semiconductor device having an outgoing surface for emitting said light, said optical waveguide being formed in a first region on a top surface of a substrate, on which a pair of first positioning marks are formed for transmitting or shielding an infrared ray only at specified spots in a second region adjacent to said first region, and said optical semiconductor device having a bottom surface on which a pair of second positioning marks for transmitting or shielding said infrared ray are formed thereof, said second positioning marks being concentric and having a different diameter from that of said first positioning marks and an inverted pattern shape to that of said first positioning marks, said method comprising the steps of:

moving said optical semiconductor device to said substrate so as to overlap said pair of said first positioning marks and said pair of said second positioning marks;

obtaining an actual distance from said outgoing surface to said pair of said second positioning marks, based on an image photographed by allowing said infrared ray to transmit through said substrate and said optical semiconductor device;

obtaining an error between said actual distance and a designed distance previously set, by subtracting said designed distance between said outgoing surface of said optical semiconductor device and said pair of said second positioning marks from said actual distance;

moving said pair of said second positioning marks relative to said pair of said first positioning marks by a quantity equal to said error so as to cancel said error; and jointing said optical semiconductor device to said substrate.

2. A method for connecting an optical waveguide and an optical semiconductor device, said optical waveguide being laid in a groove formed on a top surface of a substrate on which a pair of first positioning marks are formed for transmitting or shielding an infrared ray only at specified spots and having one end surface thrusted to a thrust end surface, that is one end of said groove, so as to be positioned, and said optical semiconductor device having a bottom surface, in which a pair of second positioning marks for transmitting or shielding said infrared ray are formed, said second positioning marks being concentric and having a different diameter from that of said first positioning marks and an inverted pattern shape to that of said first positioning marks, said method comprising the steps of:

moving said optical semiconductor device to said substrate so as to overlap said pair of said first positioning marks and said pair of said second positioning marks;

obtaining an actual distance from an outgoing surface of said optical semiconductor device to said thrust end surface, based on an image photographed by allowing said infrared ray to transmit through said substrate and said optical semiconductor device;

obtaining an error between said actual distance and a designed distance previously set, by subtracting said designed distance between said outgoing surface of said optical semiconductor device and said thrust end surface of said slit from said actual distance;

moving said pair of said second positioning marks relative to said pair of said first positioning marks by a quantity equal to said error so as to cancel said error; and jointing said optical semiconductor device to said substrate.

3. An apparatus for connecting an optical waveguide for guiding light and an optical semiconductor device having an outgoing surface for emitting said light, said optical waveguide being formed in a first region on a top surface of a substrate, on which a pair of first positioning marks are formed for transmitting or shielding an infrared ray only at specified spots in a second region adjacent to said first region, and said optical semiconductor device having a bottom surface on which a pair of second positioning marks for transmitting or shielding said infrared ray are formed thereof, said second positioning marks being concentric and having a different diameter from that of said first positioning marks and an inverted pattern shape to that of said first positioning marks, said apparatus comprising:

a stage for moving relatively said substrate and said optical semiconductor device;

a light source for irradiating said infrared ray;

a camera for photographing an image formed by said infrared ray irradiated from said light source and transmitted through said substrate and said optical semiconductor device; and a control unit for controlling said stage based on said image from said camera; wherein said control unit driving said stage so as to overlap said pair of said first positioning marks and said pair of said second positioning marks; obtaining an actual distance from said outgoing surface to said pair of said second positioning marks, based on said image photographed from said camera; obtaining an error between said actual distance and a designed distance previously set, by subtracting said designed distance between said outgoing surface of said optical semiconductor device and said pair of said second positioning marks from said actual distance; and moving said pair of said second positioning marks relative to said pair of said first positioning marks by driving said stage by a quantity equal to said error so as to cancel said error.

4. An apparatus for connecting an optical waveguide and an optical semiconductor device, said optical waveguide being laid in a groove formed on a top surface of a substrate on which a pair of first positioning marks are formed for transmitting or shielding an infrared ray only at specified spots and having one end surface thrusted to a thrust end surface, that is one end of said groove, so as to be positioned, and said optical semiconductor device having a bottom surface, in which a pair of second positioning marks for transmitting or shielding said infrared ray are formed, said second positioning marks being concentric and having a different diameter from that of said first positioning marks and an inverted pattern shape to that of said first positioning marks, said apparatus comprising:

a stage for moving relatively said substrate and said optical semiconductor device;

a light source for irradiating said infrared ray;

a camera for photographing an image formed by said infrared ray irradiated from said light source and transmitted through said substrate and said optical semiconductor device; and a control unit for controlling said stage based on said image from said camera; wherein said control unit driving said stage so as to overlap said pair of said first positioning marks and said pair of said second positioning marks; obtaining an actual distance from said pair of said second positioning marks to said thrust end surface, based on said image from said camera; obtaining an error between said actual distance and a designed distance previously set, by subtracting said designed distance between said pair of said second positioning marks of said optical semiconductor device and said thrust end surface of said slit from said actual distance, and moving said pair of said second positioning marks relative to said pair of said first positioning marks by driving said stage by a quantity equal to said error so as to cancel said error.

* * * * *